(12) United States Patent
Hiramatsu

(10) Patent No.: US 7,376,436 B2
(45) Date of Patent: May 20, 2008

(54) RADIO COMMUNICATION SYSTEM, COMMUNICATION TERMINAL DEVICE, BASE STATION DEVICE, AND RADIO COMMUNICATION METHOD

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/539,419

(22) PCT Filed: Dec. 26, 2003

(86) PCT No.: PCT/JP03/16910

§ 371 (c)(1),
(2), (4) Date: Jun. 17, 2005

(87) PCT Pub. No.: WO2004/059884

PCT Pub. Date: Jul. 15, 2004

(65) Prior Publication Data

US 2006/0058054 A1    Mar. 16, 2006

(30) Foreign Application Priority Data

Dec. 26, 2002    (JP)    ............................. 2002-377433

(51) Int. Cl.
*H04Q 7/20* (2006.01)
*H04M 1/00* (2006.01)
*H04B 17/00* (2006.01)

(52) U.S. Cl. .................... 455/522; 455/561; 455/67.13
(58) Field of Classification Search ................ 455/522, 455/69, 439, 442, 127.1, 68, 453, 436
See application file for complete search history.

(56) References Cited

U.S. PATENT DOCUMENTS 5,839,056 A * 11/1998 Hakkinen .................... 455/69

| 6,275,711 | B1 * | 8/2001 | Yamada et al. | 455/522 |
| 6,351,650 | B1 * | 2/2002 | Lundby et al. | 455/522 |
| 7,023,824 | B2 * | 4/2006 | Khullar | 370/337 |
| 7,103,325 | B1 * | 9/2006 | Jia et al. | 455/101 |
| 7,206,292 | B2 * | 4/2007 | Majidi-Ahy et al. | 370/252 |
| 7,221,654 | B2 * | 5/2007 | Tang | 370/252 |
| 2002/0123351 | A1 | 9/2002 | Miyoshi et al. | |
| 2002/0147015 | A1 | 10/2002 | Hamabe | |
| 2003/0096635 | A1 | 5/2003 | Uehara et al. | |

(Continued)

FOREIGN PATENT DOCUMENTS

JP    2000278246    10/2000

(Continued)

OTHER PUBLICATIONS

PCT International Search Report dated Apr. 20, 2004.

(Continued)

*Primary Examiner*—Tilahun Gesesse
(74) *Attorney, Agent, or Firm*—Dickinson Wright, PLLC

(57) ABSTRACT

A radio communication apparatus may receive transmit power control commands transmitted from a plurality of base station apparatuses and select a main base station apparatus having the best channel condition based on a history of received transmit power control commands. Thereafter, the apparatus transmits a signal using an error coding scheme and a modulation scheme provided by the selected main base station apparatus.

7 Claims, 5 Drawing Sheets

U.S. PATENT DOCUMENTS

2003/0100267 A1   5/2003   Itoh et al.
2003/0148744 A1   8/2003   Ide et al.
2004/0248520 A1* 12/2004   Miyoshi .................. 455/67.13

FOREIGN PATENT DOCUMENTS

| JP | 2001339458  | 12/2001 |
| JP | 200226789 A | 1/2002  |
| JP | 200284578 A | 3/2002  |
| JP | 2002290327  | 10/2002 |
| JP | 2002330461  | 11/2002 |
| WO | 9818273     | 4/1998  |
| WO | 2002041530  | 5/2002  |

OTHER PUBLICATIONS

3GPP TR25.848 V4.0.0(Mar. 2001): 3rd Generation Partnership Project; Technical Specification Group Radio Access Network; Physical layer aspects of UTRA High Speed Downlink Packet Access (Release 4), pp. 1-89, Mar. 2001.

* cited by examiner

1

RADIO COMMUNICATION SYSTEM, COMMUNICATION TERMINAL DEVICE, BASE STATION DEVICE, AND RADIO COMMUNICATION METHOD

TECHNICAL FIELD

The present invention relates to radio a communication system, communication terminal apparatus, base station apparatus and radio communication method.

BACKGROUND ART

In a radio communication system in recent years, scheduling of data transmission on a downlink such as HSDPA (High Speed Downlink Packet Access) is attracting attention on one hand and scheduling of data transmission on an uplink is under study on the other.

During scheduling on an uplink, a base station apparatus sequentially assigns data transmission timings to communication terminal apparatuses within the own cell and the communication terminal apparatuses transmit their signals at the respective assigned transmission timings.

More specifically, for example, the base station apparatus estimates the channel quality of the downlink up to the respective communication terminal apparatuses from transmit power when transmitting signals to the respective communication terminal apparatuses within the own cell. Then, uplink scheduling is realized by assigning transmission timings on the uplink to the communication terminal apparatuses in descending order of channel quality (e.g., see Unexamined Japanese Patent Publication No. 2002-290327).

However, the above described uplink scheduling has a problem that even when there is a communication terminal apparatus in the process of soft handover within the own cell, the base station apparatus performs uplink scheduling regardless and independently of the base station apparatus at the handover destination of the communication terminal apparatus in the process of soft handover. That is, when a communication terminal apparatus has established communications with a plurality of base station apparatuses to realize soft handover, if the communication terminal apparatus sends a signal at a transmission timing assigned by one base station apparatus, the signal also arrives at other base station apparatuses which are communicating with other communication terminal apparatuses and causes interference with their communications.

This problem will be explained more specifically with reference to FIG. 1.

In FIG. 1, communication terminal apparatuses (MS) #3 and MS#4 are communicating with a base station apparatus (BTS) #1 and MS#5 and MS#6 are communicating with a BTS#2. Furthermore, the MS#1 and MS#2 are moving from the cell of the BTS#1 to the cell of the BTS#2 (or from the cell of the BTS#2 to the cell of the BTS#1) and are in the process of soft handover which allows the MS#1 and MS#2 to communicate with both of the base station apparatuses BTS#1 and BTS#2.

Under such circumstances, for example, the BTS#1 performs uplink scheduling and a transmission timing is assigned to the MS#1 which is in the process of soft handover. At this time, the MS#1 sends a signal at the assigned transmission timing and this signal reaches not only the BTS#1 but also the BTS#2.

On the other hand, the BTS#2 is also autonomously performing uplink scheduling and if a transmission timing has been assigned, for example, to the MS#6 when the signal from the MS#1 arrives, the signals from the MS#1 and MS#6 arrive at the BTS#2 simultaneously and the signal from the MS#1 to which no transmission timing is assigned constitutes an interference component in the received signal of the BTS#2.

DISCLOSURE OF INVENTION

In a radio communication system which carries out uplink scheduling, it is an object of the present invention to provide a radio communication system, communication terminal apparatus, base station apparatus and radio communication method capable of reducing interference at the base station apparatus even when there is a communication terminal apparatus in the process of soft handover.

A subject matter of the present invention is for a communication terminal apparatus in the process of soft handover to select a base station apparatus having the best channel condition from among a plurality of base station apparatuses as a main base station apparatus and carry out data transmission under a condition according to the channel condition up to the main base station apparatus.

The radio communication system in accordance with one aspect of the present invention is a radio communication system comprising a plurality of base station apparatuses that send a transmit power control command instructing an increase or decrease of transmit power and a plurality of communication terminal apparatuses that control transmit power according to the transmit power control command, wherein the communication terminal apparatus comprises a reception section that receives the transmit power control command, a selection section that selects a main base station apparatus having the best channel condition up to/from the own apparatus based on a history of the received transmit power control commands, a transmission section that transmits a signal using an error coding scheme and modulation scheme notified from the selected main base station apparatus, and the base station apparatus comprises an authorization section that authorizes the communication terminal apparatus having the maximum reception quality out of the communication terminal apparatuses which have selected the own apparatus as the main base station apparatus to transmit a signal, a determining section that determines an error coding scheme and modulation scheme used by the transmission authorized communication terminal apparatus authorized to transmit a signal and a transmission section that transmits the determined error coding scheme and modulation scheme to the transmission authorized communication terminal apparatus.

In the above described radio communication system, the communication terminal apparatus preferably further comprises a calculation section that calculates extra transmit power by subtracting the transmit power determined according to the transmit power control command from maximum transmittable transmit power and the base station apparatus further comprises an estimation section that estimates reception quality corresponding to the communication terminal apparatus using the extra transmit power.

In accordance with another aspect of the present invention, the communication terminal apparatus comprises a reception section that receives transmit power control commands sent from a plurality of base station apparatuses, a selection section that selects a main base station apparatus having the best channel condition up to/from the own apparatus based on a history of the received transmit power control commands and a transmission section that transmits base station selection information that notifies the selected main base station apparatus.

In the above described communication terminal apparatus, the selection section preferably stores the transmit power control commands for a predetermined time and selects a base station apparatus having the largest difference obtained by subtracting the number of transmit power control commands instructing an increase from the number of transmit power control commands instructing a decrease as the main base station apparatus.

In the above described communication terminal apparatus, the selection section preferably stores the transmit power control commands for a predetermined time and selects a base station apparatus having the largest proportion of the number of transmit power control commands instructing a decrease in the number of transmit power control commands stored as the main base station apparatus.

The above described communication terminal apparatus preferably further comprises a control section that determines transmit power according to the transmit power control command and a calculation section that calculates extra transmit power by subtracting the determined transmit power from the maximum transmit power transmittable from the own apparatus.

In accordance with a further aspect of the present invention, the base station apparatus comprises a reception section that receives base station selection information sent by a communication terminal apparatus which notifies a main base station apparatus having the best channel condition up to/from the communication terminal apparatus, an authorization section that authorizes the communication terminal apparatus having the maximum reception quality out of the communication terminal apparatuses which have selected the own apparatus as the main base station apparatus to transmit a signal, a determining section that determines an error coding scheme and modulation scheme used by the transmission authorized communication terminal apparatus which has been authorized to transmit a signal and a transmission section that transmits the determined error coding scheme and modulation scheme to the transmission authorized communication terminal apparatus.

The above described base station apparatus preferably further comprises an estimation section that estimates reception quality corresponding to the transmission authorized communication terminal apparatus using extra transmit power obtained by subtracting actual transmit power from the maximum transmit power transmittable by the transmission authorized communication terminal apparatus and the determining section determines an error coding scheme and modulation scheme according to the estimated reception quality.

In the above described base station apparatus, the determining section preferably determines an error coding scheme and modulation scheme according to the estimated reception quality and handover information indicating whether the transmission authorized communication terminal apparatus is in the process of soft handover or not.

In the above described base station apparatus, the determining section preferably comprises a prediction section that predicts a variation of interference power using extra transmit power of a communication terminal apparatus other than the transmission authorized communication terminal apparatus and determines an error coding scheme and modulation scheme according to the estimated reception quality and the predicted variation of interference power.

The radio communication method in accordance with a still further aspect of the present invention is a radio communication method used in a communication terminal apparatus, comprising a step of receiving transmit power control commands transmitted from a plurality of base station apparatuses, a step of selecting a main base station apparatus having the best channel condition up to/from the communication terminal apparatus based on the history of the received transmit power control commands and a step of transmitting base station selection information notifying the selected main base station apparatus.

The radio communication method in accordance with a still further aspect of the present invention is a radio communication method used in a base station apparatus, comprising a step of receiving base station selection information transmitted by a communication terminal apparatus which notifies a main base station apparatus having the best channel condition up to/from the communication terminal apparatus, a step of authorizing the communication terminal apparatus having the maximum reception quality out of the communication terminal apparatuses which have selected the base station apparatus as the main base station apparatus to transmit a signal, a step of determining an error coding scheme and modulation scheme used by the transmission authorized communication terminal apparatus which has been authorized to transmit a signal and a step of transmitting the determined error coding scheme and modulation scheme to the transmission authorized communication terminal apparatus.

BEST MODE FOR CARRYING OUT THE INVENTION

Now, embodiments of the present invention will be described in detail with reference to the attached drawings.

Embodiment 1

Figure 1:
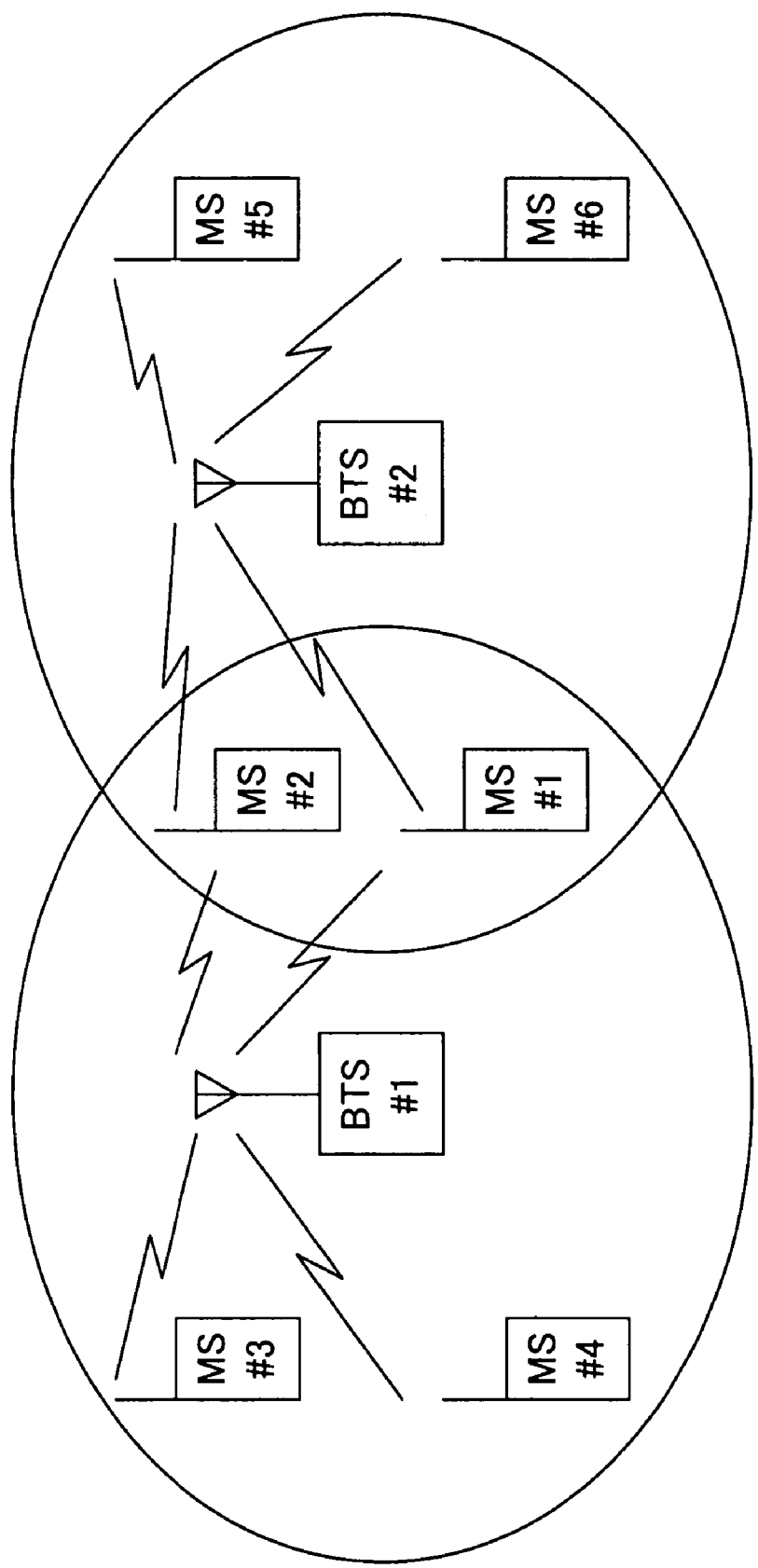
FIG. 1 illustrates an example of a radio communication system including communication terminal apparatuses in the process of soft handover.
Figure 2:
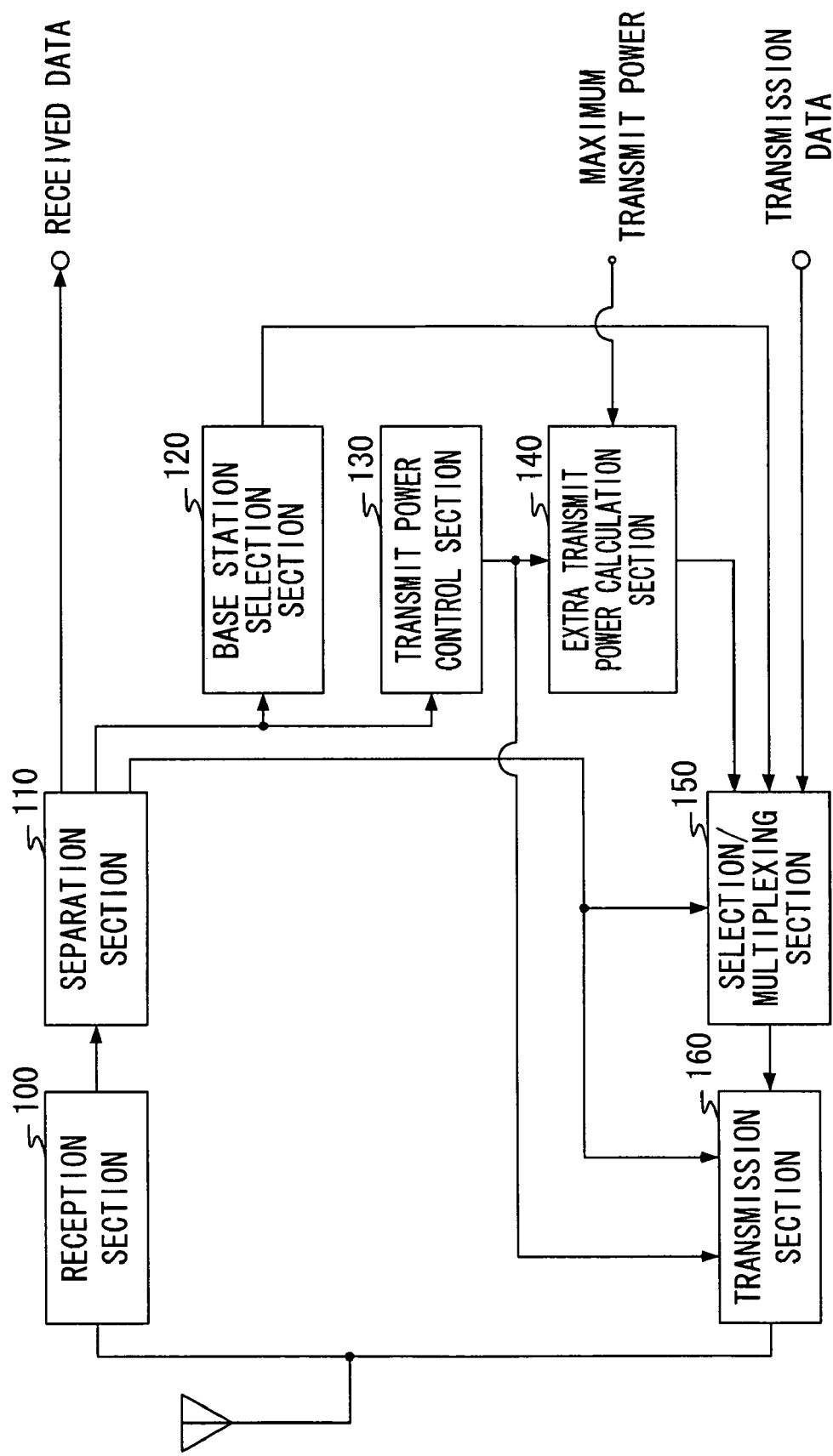
FIG. 2 is a block diagram showing the configuration of a communication terminal apparatus according to an embodiment of the present invention.

FIG. 2 is a block diagram showing the configuration of a communication terminal apparatus according to Embodiment 1 of the present invention. The communication terminal apparatus shown in the figure is provided with a reception section 100, a separation section 110, a base station selection section 120, a transmit power control section 130, an extra transmit power calculation section 140, a selection/multiplexing section 150 and a transmission section 160. Suppose the communication terminal apparatus shown in FIG. 2 is in the process of soft handover and receiving signals from a plurality of base station apparatuses.

The reception section 100 receives a signal through an antenna, carries out predetermined radio reception processing (down-conversion, A/D conversion, etc.) and then demodulates the signal.

The separation section 110 separates the demodulation result into received data and a transmit power control command instructing an increase or decrease of transmit power (hereinafter referred to as "TPC command") and outputs the TPC command to the base station selection section 120 and transmit power control section 130. Furthermore, when the demodulation result includes MCS (Modulation Coding Scheme) information indicating an error coding scheme and modulation scheme and transmission authorization information indicating that data transmission of the own apparatus is authorized, the separation section 110 outputs the MCS information and transmission authorization information to the transmission section 160 and selection/multiplexing section 150 respectively.

The base station selection section 120 selects a base station apparatus having the best channel quality from among a plurality of base station apparatuses which can be communication partners as a main base station apparatus according to the TPC command and outputs base station selection information to notify the selected main base station apparatus. More specifically, the base station selection section 120 stores TPC commands sent from the plurality of base station apparatuses by base station apparatus, the sender, and by type of increase or decrease for a predetermined time and selects a base station apparatus having the largest difference obtained by subtracting the number of TPC commands instructing an increase from the number of TPC commands instructing a decrease as the main base station apparatus. Then, the base station selection section 120 outputs base station selection information including a base station ID corresponding to the selected main base station apparatus.

Here, when transmit power of the communication terminal apparatus shown in FIG. 2 is excessive, a TPC command instructing a decrease is received and on the contrary when transmit power of the communication terminal apparatus shown in FIG. 2 is insufficient, a TPC command instructing an increase is received. Therefore, when the difference obtained by subtracting the number of TPC commands instructing an increase from the number of TPC command instructing a decrease received from the base station apparatus is large, this indicates a strong tendency that the transmit power for this base station apparatus is excessive and the channel quality up to/from this base station apparatus is believed to be good.

Here, the base station selection section 120 is assumed to select the base station apparatus having the largest difference obtained by subtracting the number of TPC commands instructing an increase from the number of TPC commands instructing a decrease as the main base station apparatus, but it is also possible to select, for example, a base station apparatus having the largest proportion of the number of TPC commands instructing a decrease in the number of TPC commands stored for a predetermined time as the main base station apparatus.

The transmit power control section 130 determines transmit power according to a TPC command. More specifically, when at least one of TPC commands sent from the respective base station apparatuses instructs a decrease, the transmit power control section 130 determines power obtained by decreasing the previously determined transmit power by a predetermined amount as the transmit power this time and determines, in other cases (that is, when TPC commands sent from all the base station apparatuses instruct an increase), power obtained by increasing the previously determined transmit power by a predetermined amount as the transmit power this time.

The extra transmit power calculation section 140 calculates extra transmit power by subtracting the transmit power determined by the transmit power control section 130 from the maximum transmit power transmittable by the communication terminal apparatus shown in FIG. 2 and outputs this calculation result as extra transmit power information. Therefore, the extra transmit power calculation section 140 constitutes a "calculation section."

The selection/multiplexing section 150 multiplexes transmission data, base station selection information and extra transmit power information and outputs the multiplexing result to the transmission section 160. Furthermore, when the separation section 110 outputs transmission authorization information indicating that data transmission of the own apparatus is authorized, the selection/multiplexing section 150 outputs the transmission data to the transmission section 160.

The transmission section 160 carries out error coding and modulation on the multiplexed data output from the selection/multiplexing section 150, then carries out predetermined radio transmission processing (D/A conversion, upconversion, etc.) and transmits the data through an antenna with the transmit power determined by the transmit power control section 130. Here, the transmission section 160 carries out error coding and modulation on the multiplexed data based on the error coding scheme and modulation scheme according to the MCS information output from the separation section 110.

Figure 3:
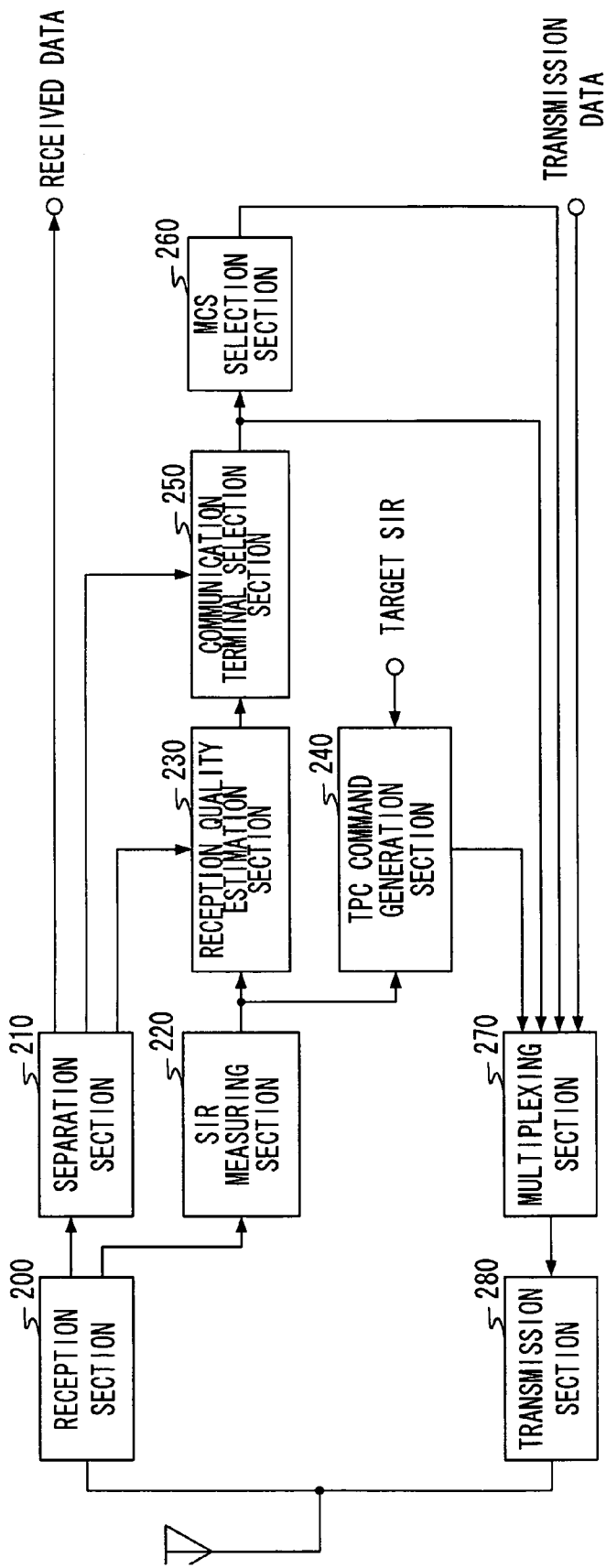
FIG. 3 is a block diagram showing the configuration of a base station apparatus according to Embodiment 1 of the present invention.

FIG. 3 is a block diagram showing the configuration of the base station apparatus according to this embodiment. The base station apparatus shown in the figure is provided with a reception section 200, a separation section 210, an SIR measuring section 220, a reception quality estimation section 230, a TPC command generation section 240, a communication terminal selection section 250, an MCS selection section 260, a multiplexing section 270, and a transmission section 280. Suppose the communication terminal apparatus shown in FIG. 2 is in the process of soft handover, communicates with a plurality of base station apparatuses and all the base station apparatuses have the same configuration as that shown in FIG. 3. Furthermore, since there is a plurality of communication terminal apparatuses including those in the process of soft handover within the cells of the respective base station apparatuses, suppose the base station apparatus shown in FIG. 3 receives signals from a plurality of communication terminal apparatuses.

The reception section 200 receives a signal through an antenna, carries out predetermined radio reception processing (down-conversion, A/D conversion, etc.) and then demodulates the signal.

The separation section 210 separates the demodulation result into received data, base station selection information and extra transmit power information, outputs the base station selection information to the communication terminal selection section 250 and outputs the extra transmit power information to the reception quality estimation section 230.

The SIR measuring section 220 measures an SIR(Signal to Interference Ratio) using the received signal.

The reception quality estimation section 230 estimates reception quality corresponding to the communication terminal apparatus which has sent the signal using the measured SIR and extra transmit power information. More specifically, the reception quality estimation section 230 adds extra transmit power to the measured SIR to thereby estimate the reception quality. Furthermore, when there is a possibility of multi-path interference, the reception quality estimation section 230 estimates reception quality with the multi-path interference component corrected.

The TPC command generation section 240 compares the measured SIR with a target SIR and generates a TPC command according to the comparison result. More specifically, when the measured SIR is equal to or smaller than the target SIR, the TPC command generation section 240 generates a TPC command instructing an increase of transmit power, and on the contrary when the measured SIR falls exceeds the target SIR, the TPC command generation section 240 generates a TPC command instructing a decrease of transmit power.

The communication terminal selection section 250 selects a communication terminal apparatus for which data transmission is to be authorized based on base station selection information from each communication terminal apparatus output from the separation section 210 and reception quality corresponding to each communication terminal apparatus output from the reception quality estimation section 230 and outputs transmission authorization information on the selected communication terminal apparatus. More specifically, the communication terminal selection section 250 references the base station selection information sent from each communication terminal apparatus, extracts the selected communication terminal apparatuses which have selected the own apparatus as the main base station apparatus and selects the one having the maximum reception quality from among the extracted communication terminal apparatuses. Therefore, the communication terminal selection section 250 constitutes an "authorization section."

The MCS selection section 260 selects an error coding scheme and modulation scheme used when the communication terminal apparatus selected by the communication terminal selection section 250 transmits data and outputs the selection result as MCS information to the multiplexing section 270. At this time, the MCS selection section 260 selects an error coding scheme and modulation scheme most suitable for this communication terminal apparatus based on the reception quality corresponding to the communication terminal apparatus for which data transmission is authorized by the communication terminal selection section 250. Therefore, the MCS selection section 260 constitutes a "determining section."

The multiplexing section 270 multiplexes the transmission data, TPC command, transmission authorization information and MCS information and outputs the multiplexing result to the transmission section 280.

The transmission section 280 carries out predetermined radio transmission processing (D/A conversion, up-conversion, etc.) on the multiplexed data output from the multiplexing section 270 and transmits the multiplexed data through the antenna.

Next, the operation of the communication terminal apparatus and base station apparatus in the above described configurations will be explained.

First, a signal including a TPC command from the base station apparatus is received by the reception section 100 through the antenna of the communication terminal apparatus. The received signal is subjected to predetermined radio reception processing and demodulated. Then, the separation section 110 separates the demodulation result into the received data and TPC command and the TPC command is output to the base station selection section 120 and transmit power control section 130. Here, since the communication terminal apparatus is in the process of soft handover, TPC commands are being sent from a plurality of base station apparatuses which can be the communication partners and the TPC commands sent from all the base station apparatuses are output to the base station selection section 120 and transmit power control section 130.

Then, the base station selection section 120 selects a base station apparatus having the best channel quality up to/from the own apparatus as the main base station apparatus according to the history of the TPC commands from the respective base station apparatuses. That is, the base station selection section 120 uses TPC commands stored for a predetermined time, calculates the difference obtained by subtracting the number of TPC commands instructing an increase from the number of TPC commands instructing a decrease or calculating the proportion of the number of TPC commands instructing a decrease in the number of TPC commands stored, etc., and thereby selects a base station apparatus estimated to have the best channel quality up to/from the own apparatus as the main base station apparatus. This selection result is output to the selection/multiplexing section 150 as base station selection information such as the base station ID of the main base station apparatus.

On the other hand, the transmit power control section 130 determines transmit power for data transmission according to the TPC command output. That is, when at least one of the TPC commands sent from all the base station apparatuses that can be communication partners instructs a decrease, the transmit power control section 130 determines the power obtained by decreasing the previously determined transmit power by a predetermined amount as the transmit power this time and when the TPC commands sent from all the base station apparatuses instruct an increase, the transmit power control section 130 determines the power obtained by increasing the previously determined transmit power by a predetermined amount as the transmit power this time. The determined transmit power is output to the transmission section 160 and output to the extra transmit power calculation section 140 as well.

Then, the extra transmit power 140 calculates extra transmit power by subtracting transmit power determined by the transmit power control section 130 from the maximum transmit power transmittable by the own apparatus and outputs the result as the extra transmit power information to the selection/multiplexing section 150.

When the base station selection information and extra transmit power information are output to the selection/multiplexing section 150, the information and transmission data are multiplexed by the selection/multiplexing section 150 and the multiplexed data obtained is output to the transmission section 160. Then, the transmission section 160 carries out predetermined radio transmission processing on the multiplexed data and transmits the multiplexed data through the antenna with transmit power determined by the transmit power control section 130.

The transmitted signal is received by all base station apparatuses which can be the communication partners of the communication terminal apparatus including the main base station apparatus. Furthermore, other communication terminal apparatuses carry out processing similar to the above described operation, signals including base station selection information and extra transmit power information are sent and received by all base station apparatuses which can be the communication partners of the respective communication terminal apparatuses.

The received signal received by the reception section 200 through the antenna of the base station apparatus is subjected to predetermined radio reception processing and demodulated. Then, the separation section 210 separates the demodulation result into received data, base station selection information and extra transmit power information, and the base station selection information is output to the communication terminal selection section 250 and the extra transmit power information is output to the reception quality estimation section 230. Here, the base station apparatus outputs the base station selection information and extra transmit power information sent from all the communication terminal apparatuses within the own cell to the communication terminal selection section 250 and reception quality estimation section 230 respectively.

On the other hand, the SIR measuring section 220 measures an SIR using the received signal received by the reception section 200. This measured SIR is output to the reception quality estimation section 230 and TPC command generation section 240. Then, the TPC command generation section 240 compares the measured SIR with a target SIR and generates a TPC command according to the comparison result. More specifically, when the measured SIR is equal to or lower than the target SIR, the TPC command generation section 240 generates a TPC command instructing an increase of transmit power, and on the contrary when the measured SIR is equal to or higher than the target SIR, the TPC command generation section 240 generates a TPC command instructing a decrease of transmit power. This TPC command is output to the multiplexing section 270.

Furthermore, the reception quality estimation section 230 uses the measured SIR and extra transmit power information to estimate reception quality corresponding to each communication terminal apparatus. That is, extra transmit power is added to the measured SIR and when multi-path interference is expected to occur, the interference component is corrected and the reception quality corresponding to each communication terminal apparatus is thereby estimated. This estimation result is output to the communication terminal selection section 250.

Then, using the estimation result output from the reception quality estimation section 230 and the base station selection information, the communication terminal selection section 250 selects a communication terminal apparatus for which data transmission is to be authorized. That is, the communication terminal selection section 250 references the base station selection information sent from each communication terminal apparatus, extracts the communication terminal apparatuses which have selected the own apparatus as the main base station apparatus and selects the one having the maximum reception quality from among these communication terminal apparatuses as the communication terminal apparatus for which data transmission is authorized. Then, transmission authorization information on the selected communication terminal apparatus is output to the MCS selection section 260 and multiplexing section 270.

When the transmission authorization information is output to the MCS selection section 260, the MCS selection section 260 selects an error coding scheme and modulation scheme to be used when the communication terminal apparatus authorized to transmit data sends data and the selection result is output to the multiplexing section 270 as MCS information. Here, the selection of the MCS by the MCS selection section 260 is carried out by selecting the error coding scheme and modulation scheme most suitable for this communication terminal apparatus based on the reception quality corresponding to the communication terminal apparatus for which data transmission is authorized.

Furthermore, the communication terminal apparatus for which data transmission is authorized is the one having the maximum estimated reception quality out of the communication terminal apparatuses which have selected the own apparatus as the main base station apparatus having the best channel quality. Therefore, the MCS selected by the MCS selection section 260 is the combination corresponding to the fastest transmission rate out of the combinations of error coding schemes and modulation schemes which are considered currently available. The communication terminal apparatus carries out data transmission using this MCS, and can thereby shorten the time required for data transmission by the communication terminal apparatus and reduce interference with other communications.

When the TPC command, transmission authorization information and MCS information are output to the multiplexing section 270, the information and transmission data are multiplexed by the multiplexing section 270 and the multiplexed data obtained is output to the transmission section 280. The transmission section 280 carries out predetermined radio transmission processing on the multiplexed data and sends the multiplexed data through the antenna.

The transmitted signal is received by all communication terminal apparatuses which can be communication partners including the communication terminal apparatus for which data transmission is authorized.

The received signal received by the reception section 100 through the antenna of the communication terminal apparatus is subjected to predetermined radio reception processing and demodulated. Then, the separation section 110 outputs the MCS information of the demodulation result to the transmission section 160 and outputs the transmission authorization information to the selection/multiplexing section 150. In this way, the communication terminal apparatus for which data transmission is authorized is authorized to transmit data of the own apparatus, and therefore the selection/multiplexing section 150 outputs transmission data to the transmission section 160, where error coding and modulation are carried out based on the error coding scheme and modulation scheme according to the MCS information and the signal is transmitted through the antenna.

The transmission here is realized in the combination corresponding to the fastest transmission rate out of the combinations of error coding schemes and modulation schemes which are considered available as described above, and therefore the time required to transmit the same amount of data is shortest and it is possible to thereby reduce the number of interference signals arriving at base station apparatuses other than the main base station apparatus and reduce interference at the base station apparatuses.

Thus, according to this embodiment, the communication terminal apparatus selects a main base station apparatus having the best channel quality from among base station apparatuses which can be communication partners using a history of TPC commands and transmits the base station selection information, the base station apparatus selects the one having the maximum reception quality out of the communication terminal apparatuses which have selected the own apparatus as the main base station apparatus as the communication terminal apparatus for which data transmission is authorized and determines the error coding scheme and modulation scheme most suitable for the communication terminal apparatus and the communication terminal apparatus transmits data using the error coding scheme and modulation scheme, and therefore it is possible to use the combination corresponding to the fastest transmission rate out of combinations of available error coding schemes and modulation schemes, minimize the time necessary to transmit a signal from the communication terminal apparatus which produces interference with the base station apparatuses other than the main base station apparatus and reduce interference at the base station apparatuses in a radio communication system which carries out uplink scheduling even when there are communication terminal apparatuses in the process of soft handover.

This embodiment has been explained assuming that the base station apparatus multiplexes MCS information and a TPC command and sends the multiplexed data, but the present invention is not limited to this and any configuration can be adopted if it at least notifies the MCS most suitable for the communication terminal apparatus which is determined to be authorized to transmit data based on the base station selection information and extra transmit power information transmitted from the communication terminal apparatus to the communication terminal apparatus.

Furthermore, this embodiment has been explained assuming that the extra transmit power calculation section 140 provided for the communication terminal apparatus calculates extra transmit power by subtracting transmit power determined according to a TPC command from maximum transmit power and the extra transmit power information is transmitted to the base station apparatus through the selection/multiplexing section 150 and transmission section 160, but the present invention is not limited to this and the communication terminal apparatus can also multiplex base station selection information and transmission data without being provided with or operating the extra transmit power calculation section 140 and transmit this multiplexed data to the base station apparatus through the transmission section 160. Furthermore, by so doing, the reception quality estimation section 230 at the base station apparatus is also not necessary or need not be operated. Thus, by so doing, the base station apparatus determines the reception quality of the communication terminal apparatus using only an SIR of the received signal, but it is sufficiently possible to select a communication terminal apparatus having a good channel condition with the base station apparatus.

Embodiment 2

A feature of Embodiment 2 of the present invention is that a base station apparatus detects that a communication terminal apparatus is in the process of soft handover and if the communication terminal apparatus for which data transmission is to be authorized is in the process of soft handover, the base station apparatus changes the error coding scheme and modulation scheme assigned to this communication terminal apparatus to slower ones than those corresponding to the fastest available transmission rate.

Figure 4:
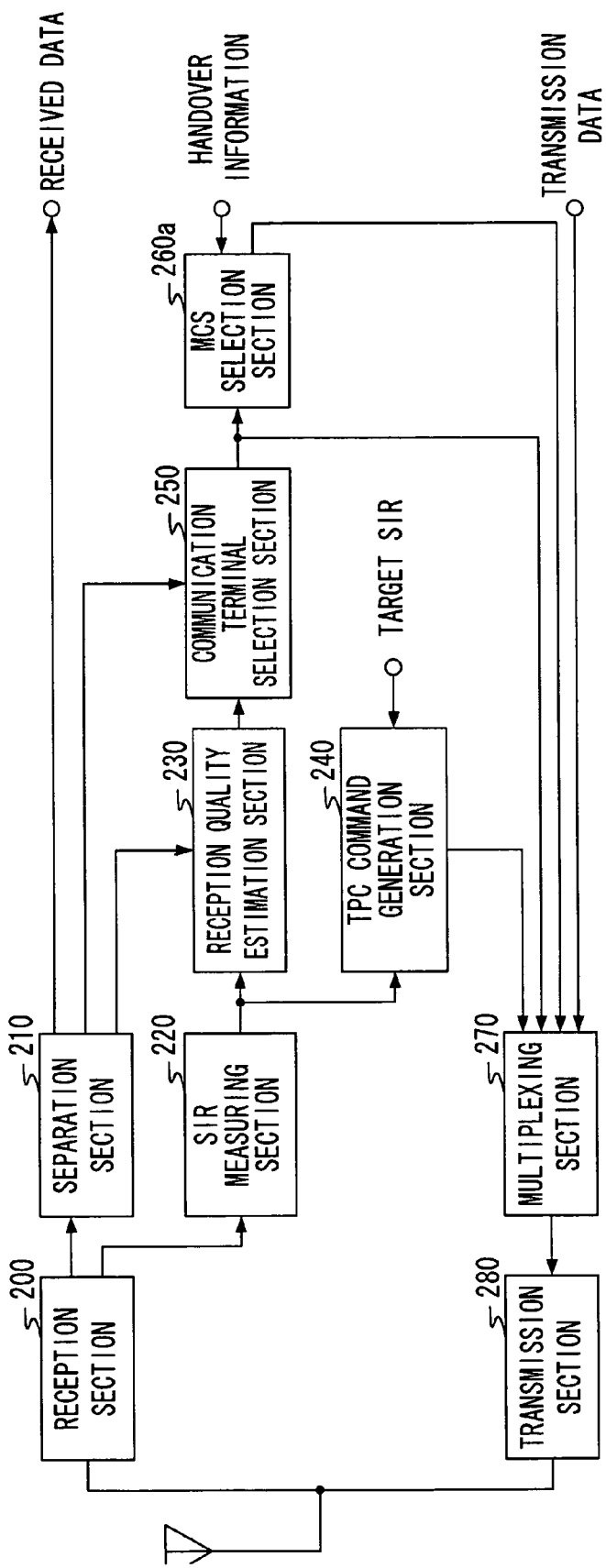
FIG. 4 is a block diagram showing the configuration of a base station apparatus according to Embodiment 2 of the present invention.

FIG. 4 is a block diagram showing the configuration of the base station apparatus according to Embodiment 2 of the present invention. In the base station apparatus shown in the figure, the same components as those of the base station apparatus shown in FIG. 3 are assigned the same reference numerals and explanations thereof will be omitted. Furthermore, the configuration of the communication terminal apparatus according to this embodiment is the same as the configuration of the communication terminal apparatus according to Embodiment 1 (FIG. 2) and explanations thereof will be omitted.

The base station apparatus shown in FIG. 4 is provided with a reception section 200, a separation section 210, an SIR measuring section 220, a reception quality estimation section 230, a TPC command generation section 240, a communication terminal selection section 250, an MCS selection section 260a, a multiplexing section 270 and a transmission section 280.

The MCS selection section 260a detects whether a communication terminal apparatus selected by the communication terminal selection section 250 is in the process of soft handover or not based on handover information indicating whether each communication terminal apparatus within the own cell is in the process of soft handover or not, selects an error coding scheme and modulation scheme used by this communication terminal apparatus to transmit data and outputs the selection result as MCS information to the multiplexing section 270. At this time, when this communication terminal apparatus is not in the process of soft handover, the MCS selection section 260a selects a combination of an available error coding scheme and modulation scheme corresponding to the fastest transmission rate based on the reception quality corresponding to the communication terminal apparatus for which data transmission is authorized by the communication terminal selection section 250. On the other hand, when the communication terminal apparatus is in the process of soft handover, the MCS selection section 260a selects a combination corresponding to a lower transmission rate than the above described combination.

This allows the base station apparatus to receive data transmitted from a communication terminal apparatus in the process of soft handover more reliably and can thereby improve the throughput of the entire radio communication system.

Next, the operations of the communication terminal apparatus and base station apparatus in the above described configurations will be explained.

First, as in the case of Embodiment 1, the communication terminal apparatus selects a base station apparatus based on a history of TPC commands. That is, the communication terminal apparatus selects a base station apparatus having the best channel quality up to/from the own apparatus as the main base station apparatus and transmits the selection result as base station selection information together with extra transmit power information to the communication terminal apparatus.

Then, as in the case of Embodiment 1, the base station apparatus receives a signal, the reception quality estimation section 230 estimates reception quality corresponding to each communication terminal apparatus from the extra transmit power information, the communication terminal selection section 250 selects a communication terminal apparatus for which data transmission is to be authorized based on this reception quality and base station selection information and outputs transmission authorization information to the MCS selection section 260a and multiplexing section 270.

When the transmission authorization information is output to the MCS selection section 260a, the MCS selection section 260a selects an error coding scheme and modulation scheme used by the communication terminal apparatus for which data transmission is authorized to transmit data and outputs the selection result as MCS information to the multiplexing section 270. Here, when the communication terminal apparatus for which data transmission is authorized is not in the process of soft handover, the selection of MCS by the MCS selection section 260a is realized by selecting a combination of an available error coding scheme and modulation scheme corresponding to the fastest transmission rate, and when this communication terminal apparatus is in the process of soft handover, the selection of MCS is realized by selecting a combination corresponding to a lower transmission rate than that of the above described combination.

As in the case of Embodiment 1, transmission authorization information and MCS information are sent to the communication terminal apparatus and the communication terminal apparatus authorized to transmit data performs error coding and modulation on transmission data based on the error coding scheme and modulation scheme according to the received MCS information and transmits the data through the antenna.

Thus, according to this embodiment, when a communication terminal apparatus is in the process of soft handover, the base station apparatus changes a combination of an error coding scheme and modulation scheme to be instructed to the communication terminal apparatus for which data transmission is to be authorized to one corresponding to a lower transmission rate, and therefore the main base station apparatus can receive data transmitted from the communication terminal apparatus in the process of soft handover more reliably and improve the throughput of the entire radio communication system.

According to this embodiment, when an SIR (or estimated reception quality estimated by the reception quality estimation section 230) measured by the SIR measuring section 220 is lower, it is possible to make data reception by the main base station apparatus more reliable by changing the combination of error coding scheme and modulation scheme selected by the MCS selection section 260a to one corresponding to a lower transmission rate. This is attributable to the fact about a fading variation that the probability of changing from a low level to a high level or from a high level to a low level is high, whereas the probability of keeping a low level or high level is low.

Embodiment 3

A feature of Embodiment 3 of the present invention is that base station apparatuses other than a main base station apparatus predict interference power through data transmission from a communication terminal apparatus.

Figure 5:
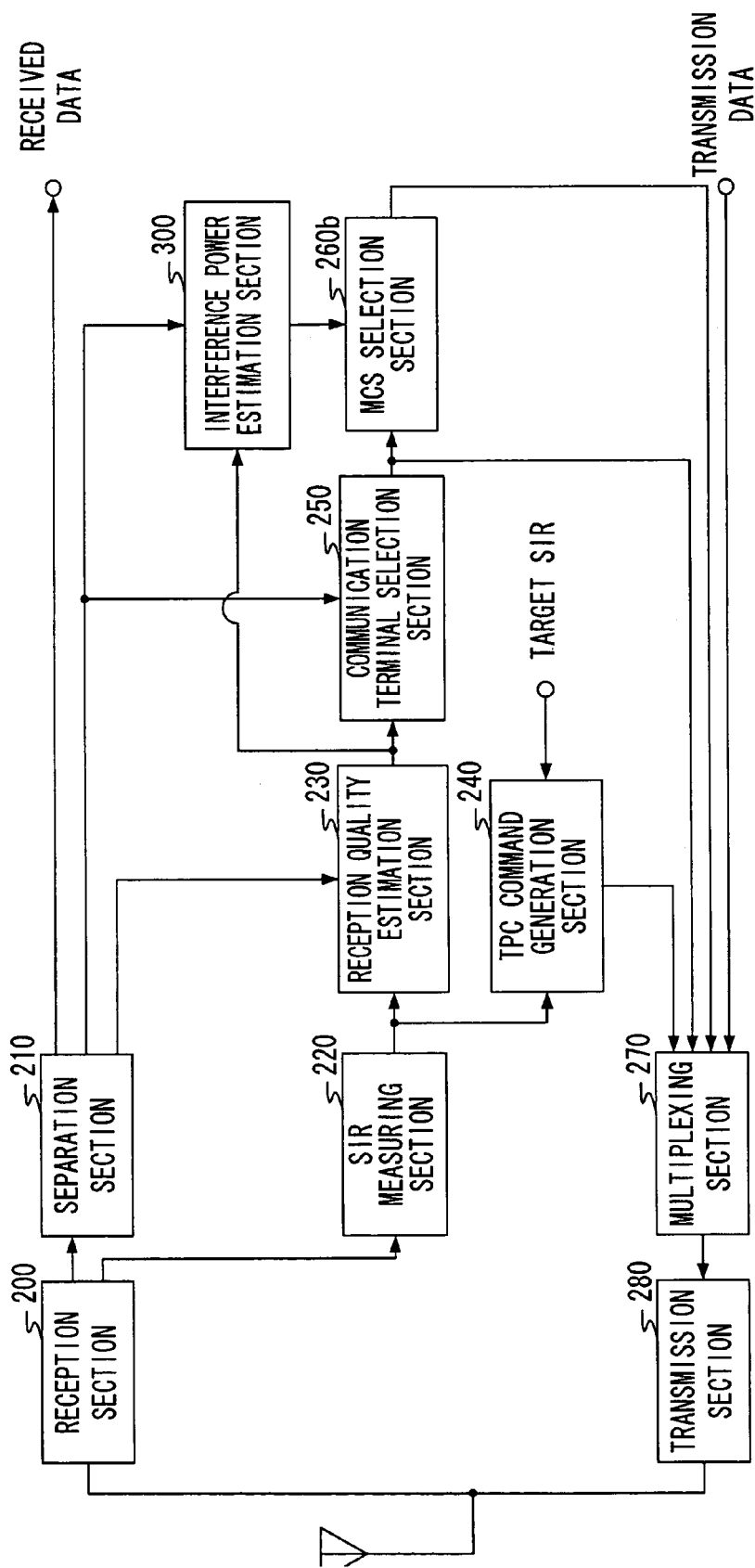
FIG. 5 is a block diagram showing the configuration of a base station apparatus according to Embodiment 3 of the present invention.

FIG. 5 is a block diagram showing a base station apparatus according to Embodiment 3 of the present invention. In the base station apparatus shown in the figure, the same components as those of the base station apparatus shown in FIG. 3 are assigned the same reference numerals and explanations thereof will be omitted. Furthermore, the configuration of the communication terminal apparatus according to this embodiment is the same as the configuration of the communication terminal apparatus according to Embodiment 1 (FIG. 2) and explanations thereof will be omitted.

The base station apparatus shown in FIG. 5 is provided with a reception section 200, a separation section 210, an SIR measuring section 220, a reception quality estimation section 230, a TPC command generation section 240, a communication terminal selection section 250, an MCS selection section 260b, a multiplexing section 270, a transmission section 280 and an interference power estimation section 300.

The MCS selection section 260b selects an error coding scheme and modulation scheme used when a communication terminal apparatus selected by the communication terminal selection section 250 transmits data and outputs the selection result as MCS information to the multiplexing section 270. At this time, the MCS selection section 260b selects an error coding scheme and modulation scheme most suitable for this communication terminal apparatus based on the reception quality corresponding to the communication terminal apparatus for which data transmission is authorized by the communication terminal selection section 250 and the result of interference power estimation by the interference power estimation section 300.

The interference power estimation section 300 predicts an increase in an amount of interference by communication terminal apparatuses which have selected a base station apparatus other than the own apparatus as the main base station apparatus based on base station selection information and extra transmit power information from each communication terminal apparatus output from the separation section 210. More specifically, the interference power estimation section 300 extracts a communication terminal apparatus having the maximum extra transmit power for each group of communication terminal apparatuses which have selected a base station apparatus other than the own apparatus as the main base station apparatus and estimates a value obtained by multiplying the extra transmit power of this communication terminal apparatus by a probability that the communication terminal apparatus may be authorized to transmit data and correcting the multiplication result with a spreading factor corresponding to the communication terminal apparatus as interference power by this communication terminal apparatus. Therefore, the interference power estimation section 300 constitutes a "prediction section."

Next, the operations of the communication terminal apparatus and base station apparatus in the above described configurations will be explained.

First, as in the case of Embodiment 1, the communication terminal apparatus selects a base station apparatus based on a history of TPC commands. That is, a base station apparatus having the best channel quality up to/from the own apparatus is selected as a main base station apparatus by the communication terminal apparatus and the selection result is transmitted as base station selection information together with extra transmit power information to the communication terminal apparatus.

Then, as in the case of Embodiment 1, the base station apparatus receives the signal, the reception quality estimation section 230 estimates reception quality corresponding to each communication terminal apparatus from the extra transmit power information, the communication terminal selection section 250 selects a communication terminal apparatus for which data transmission is to be authorized based on this reception quality and base station selection information and outputs the transmission authorization information to the MCS selection section 260b and multiplexing section 270.

On the other hand, the interference power estimation section 300 estimates interference power by the communication terminal apparatuses which have selected a base station apparatus other than the own apparatus as the main base station apparatus based on the base station selection information and extra transmit power information. That is, a communication terminal apparatus having the maximum extra transmit power is extracted for each group of communication terminal apparatuses which have selected each base station apparatus other than the own apparatus as the main base station apparatus and interference power is estimated by multiplying the extra transmit power of this communication terminal apparatus by the probability that the communication terminal apparatus may be authorized to transmit data and correcting the multiplication result with a spreading factor corresponding to the communication terminal apparatus. This estimation result is output to the MCS selection section 260b.

When the transmission authorization information and estimation result of interference power are output to the MCS selection section 260b; the MCS selection section 260b selects an error coding scheme and modulation scheme used when a communication terminal apparatus for which data transmission is authorized transmits data and outputs the selection result as MCS information to the multiplexing section 270. Here, the selection of MCS by the MCS selection section 260b is realized not only by selecting an error coding scheme and modulation scheme most suitable for the communication terminal apparatus for which data transmission is authorized but also by taking into account a predicted increase in interference power. Therefore, compared to Embodiment 1, the selected error coding scheme and modulation scheme correspond to the actual communication condition.

As in the case of Embodiment 1, transmission authorization information and MCS information are sent to the communication terminal apparatus, the transmission data is subjected to error coding and modulation by the communication terminal apparatus for which data transmission is authorized based on an error coding scheme and modulation scheme according to the received MCS information and sent through the antenna.

Thus, this embodiment predicts interference power by the communication terminal apparatuses which have selected a base station apparatus other than the own apparatus as the main base station apparatus based on the extra transmit power information and selects an error coding scheme and modulation scheme used by the communication terminal apparatus for which transmission is authorized by the own apparatus taking into account the interference power, and therefore it is possible to allow the communication terminal apparatus to select an error coding scheme and modulation scheme corresponding to the communication condition when the communication terminal apparatus actually transmits data, minimize the time necessary to transmit a signal from the communication terminal apparatus, reduce interference and realize more accurate communications.

As explained above, according to the present invention, it is possible to reduce interference at the base station apparatus in a radio communication system which performs uplink scheduling even when there are communication terminal apparatuses in the process of soft handover.

Furthermore, according to the present invention, the communication terminal apparatus selects a main base station apparatus having the best channel condition, the base station apparatus authorizes a communication terminal apparatus having the maximum reception quality out of the communication terminal apparatuses which have selected the own apparatus as the main base station apparatus to transmit a signal and instructs an error coding scheme and modulation scheme, and therefore the communication terminal apparatus can send the signal using a combination corresponding to the fastest transmission rate out of the combinations of available error coding schemes and modulation schemes, and it is possible to minimize a signal transmission time from the communication terminal apparatus even when there are communication terminal apparatuses in the process of soft handover in a radio communication system carrying out uplink scheduling and reduce interference at the base station apparatus.

Furthermore, according to the present invention, the communication terminal apparatus calculates extra transmit power and the base station apparatus estimates reception quality using the extra transmit power, and therefore it is possible to estimate the reception quality corresponding to the communication terminal apparatus accurately and determine an error coding scheme and modulation scheme more suitable for the transmission authorized communication terminal apparatus as a result of using this estimation result to determine the error coding scheme and modulation scheme used by the transmission authorized communication terminal apparatus.

Furthermore, according to the present invention, a main base station apparatus having the best channel condition up to/from the own apparatus (communication terminal apparatus) is selected based on the history of transmit power control commands and the selection result is transmitted as base station selection information, and therefore the base station apparatus can authorize a communication terminal apparatus having the best channel condition to transmit data based on the base station selection information and instruct the communication terminal apparatus on the optimal error coding scheme and modulation scheme, minimize the signal transmission time from the communication terminal apparatus consequently and reduce interference at the base station apparatus.

Furthermore, according to the present invention, the communication terminal apparatus stores a transmit power control commands for a predetermined time and selects a base station apparatus having the largest difference obtained by subtracting the number of transmit power control commands instructing an increase from the number of transmit power control commands instructing a decrease as the main base station apparatus, and can thereby accurately select a base station apparatus having the best channel condition as the main base station apparatus.

Furthermore, according to the present invention, the communication terminal apparatus stores transmit power control commands for a predetermined time, selects a base station apparatus having the largest proportion of the number of transmit power control commands instructing a decrease in the number of transmit power control commands stored as the main base station apparatus, and can thereby accurately select a base station apparatus having the best channel condition as the main base station apparatus.

Furthermore, according to the present invention, extra transmit power is calculated by subtracting transmit power determined according to a transmit power control command from the maximum transmit power transmittable by the communication terminal apparatus, and therefore the base station apparatus can estimate reception quality using the extra transmit power and accurately estimate the reception quality corresponding to the communication terminal apparatus.

Furthermore, according to the present invention, a communication terminal apparatus having the maximum reception quality out of communication terminal apparatuses which have selected the own apparatus as the main base station apparatus is authorized to transmit a signal and instructed on an error coding scheme and modulation scheme, and therefore the communication terminal apparatus can transmit a signal using the combination corresponding to the fastest transmission rate out of the combinations of available error coding schemes and modulation schemes, minimize the signal transmission time from the communication terminal apparatus even when there are communication terminal apparatuses in the process of soft handover in a radio communication system which performs uplink scheduling and reduce interference at the base station apparatus.

Furthermore, the present invention estimates reception quality corresponding to the transmission authorized communication terminal apparatus using extra transmit power, determines an error coding scheme and modulation scheme according to the estimation result, and can thereby determine an error coding scheme and modulation scheme more suitable for the transmission authorized communication terminal apparatus.

Furthermore, according to the present invention, the base station apparatus determines an error coding scheme and modulation scheme according to estimated reception quality and handover information indicating whether the transmission authorized communication terminal apparatus is in the process of soft handover or not, and can thereby allow, for example, a communication terminal apparatus in the process of soft handover to use an error coding scheme and modulation scheme corresponding to a low transmission rate, perform reliable communications and improve the throughput of the entire radio communication system.

Furthermore, according to the present invention, the base station apparatus predicts a variation in interference power using extra transmit power of a communication terminal apparatus other than a transmission authorized communication terminal apparatus and determines an error coding scheme and modulation scheme according to the estimated reception quality and predicted variation in interference power, and therefore it is possible to select an error coding scheme and modulation scheme corresponding to the communication state when the communication terminal apparatus actually transmits data, minimize the time necessary to transmit a signal from the communication terminal apparatus, reduce interference and carry out more accurate communications.

The present application is based on Japanese Patent Application No. 2002-377433 filed on Dec. 26, 2002, published as Japanese Laid Open Application No. 2004-208197 on Jul. 22, 2004, the entire content of which is expressly incorporated by reference herein.

INDUSTRIAL APPLICABILITY

The present invention is suitable for use in a communication terminal apparatus, base station apparatus and radio communication system in a mobile communication system which performs transmit power control.

The invention claimed is:

1. A radio communication system comprising:
a plurality of base station apparatuses that each send a transmit power control command instructing an increase or decrease of transmit power; and
a plurality of communication terminal apparatuses that each control transmit power according to a received transmit power control command,
wherein each of said communication terminal apparatuses comprises:
a reception section that receives transmit power control commands;
a selection section that selects a main base station apparatus having the best channel condition among the plurality of base station apparatuses based on a history of received transmit power control commands; and
a transmission section that transmits a signal using an error coding scheme and a modulation scheme notified from the selected main base station apparatus, and
each of said base station apparatuses comprises:
an authorization section that authorizes the communication terminal apparatus having the maximum reception quality out of the communication terminal apparatuses which have selected said base station apparatus as the main base station apparatus to transmit a signal;
a determining section that determines an error coding scheme and modulation scheme used by the transmission authorized communication terminal apparatus authorized to transmit the signal; and
a transmission section that transmits the determined error coding scheme and a modulation scheme to said transmission authorized communication terminal apparatus.

2. The radio communication system according to claim 1, wherein each of said communication terminal apparatuses further comprises a calculation section that calculates extra transmit power by subtracting a transmit power determined according to said received transmit power control command from the maximum transmittable transmit power, and
each of said base station apparatuses further comprises an estimation section that estimates reception quality for the authorized communication terminal apparatus using said extra transmit power.

3. A base station apparatus comprising:
a reception section that receives base station selection information sent by a communication terminal apparatus which notifies a main base station apparatus having the best channel condition;
an authorization section that authorizes a communication terminal apparatus having the maximum reception quality out of a plurality of communication terminal apparatuses which have selected said base station apparatus as the main base station apparatus to transmit a signal;
a determining section that determines an error coding scheme and a modulation scheme used by the transmission authorized communication terminal apparatus which has been authorized to transmit the signal; and
a transmission section that transmits the determined error coding scheme and modulation scheme to said transmission authorized communication terminal apparatus.

4. The base station apparatus according to claim 3, further comprising:
an estimation section that estimates reception quality of said transmission authorized communication terminal apparatus using extra transmit power obtained by subtracting actual transmit power from the maximum transmit power transmittable by said transmission authorized communication terminal apparatus, wherein
said determining section determines the error coding scheme and modulation scheme according to the estimated reception quality.

5. The base station apparatus according to claim 4, wherein said determining section determines the error coding scheme and modulation scheme according to the estimated reception quality and handover information indicating whether said transmission authorized communication terminal apparatus is in the process of soft handover or not.

6. The base station apparatus according to claim 4, wherein said determining section:
comprises a prediction section that predicts a variation of interference power using extra transmit power of a communication terminal apparatus other than said transmission authorized communication terminal apparatus, and
determines the error coding scheme and modulation scheme according to the estimated reception quality and the predicted variation of interference power.

7. A radio communication method used in a base station apparatus, the method comprising:

receiving base station selection information transmitted by a communication terminal apparatus which notifies a main base station apparatus having the best channel condition;

authorizing the communication terminal apparatus having the maximum reception quality out of the communication terminal apparatuses which have selected said base station apparatus as the main base station apparatus to transmit a signal;

determining an error coding scheme and a modulation scheme used by the transmission authorized communication terminal apparatus which has been authorized to transmit the signal; and transmitting the determined error coding scheme and modulation scheme to said transmission authorized communication terminal apparatus.

* * * * *